United States Patent [19]

Hiwada

[11] Patent Number: 5,134,512
[45] Date of Patent: Jul. 28, 1992

[54] SCANNING EXPOSURE APPARATUS HAVING A MODULATION SIGNAL ADJUSTING UNIT

[75] Inventor: Shuhei Hiwada, Toyohashi, Japan

[73] Assignee: Brother Kogyo Kabushiki Kaisha, Nagoya, Japan

[21] Appl. No.: 579,960

[22] Filed: Sep. 10, 1990

[30] Foreign Application Priority Data

Sep. 29, 1989 [JP] Japan .................................. 1-256348

[51] Int. Cl.$^5$ ........................ G02B 26/08; H04N 1/04
[52] U.S. Cl. .................................... 359/196; 359/246; 358/417; 358/474
[58] Field of Search ................................ 350/6.1–6.91; 358/408–418, 481–486, 319–321, 330, 148–153, 443–475; 340/720, 732, 739, 744; 250/234–236; 359/196–226, 245–246, 276–279, 298–300; 346/106, 108, 160

[56] References Cited

U.S. PATENT DOCUMENTS

| | | | |
|---|---|---|---|
| 4,057,838 | 11/1977 | Doglues et al. | 358/417 |
| 4,613,877 | 9/1986 | Spencer et al. | 358/481 |
| 4,661,699 | 8/1987 | Welmers et al. | 250/235 |
| 4,729,617 | 3/1988 | Shimada et al. | 350/6.8 |
| 4,757,191 | 7/1988 | Shimada et al. | 250/235 |
| 4,760,251 | 7/1988 | Shimada et al. | 250/235 |
| 4,800,270 | 1/1989 | Blais | 250/235 |
| 4,893,136 | 1/1990 | Curry | 358/474 |
| 4,920,429 | 4/1990 | Jaffe et al. | 358/486 |
| 4,926,263 | 5/1990 | Yokota | 358/474 |
| 4,946,233 | 8/1990 | Seto | 359/212 |
| 4,975,626 | 12/1990 | Yagi et al. | 346/160 |

Primary Examiner—Rodney B. Bovernick
Assistant Examiner—Thong Nguyen
Attorney, Agent, or Firm—Oliff & Berridge

[57] ABSTRACT

A scan-exposure apparatus comprises a detector for detecting the values of the digital modulation signal in adjacent time series and the differences of the values therebetween and an exposure time changing device for compensating the time spans of the modulation signal. The detector detects the values of the digital modulation signal in two adjacent units of the time series and the difference between the values. An exposure time compensation device adjusts time spans of the time series of the modulation signal. Thus, the modulation signal pattern is rendered similar to the exposure of the exposure beam.

13 Claims, 3 Drawing Sheets

SCANNING EXPOSURE APPARATUS HAVING A MODULATION SIGNAL ADJUSTING UNIT

BACKGROUND OF THE INVENTION

1. Field of the invention

The present invention relates to a scan-exposure apparatus. More particularly, the present invention relates to a scan-exposure apparatus that can render an exposure signal pattern similar to a modulation signal pattern when the intensity of an exposure beam is modulated based on the modulation signal.

2. Related art

In a scan-exposure apparatus that modulates output intensity, the influence of an intensity distribution pattern on the exposure beam needs to be reduced in order to generate an exposure beam having an exposure pattern that corresponds to a modulation signal pattern because the intensity distribution pattern of the exposure beam is not linear.

Conventionally, to attain this object, a hyper-elliptic exposure beam whose minor axis is parallel to the scanning direction has been employed. Alternatively, a high frequency clock signal for driving a modulation signal generation means has been used to eliminate the intensity distribution influence in advance.

However, employing a hyper-elliptic exposure beam requires higher precision of the optical parts of the scan exposure apparatus and raises the costs without sufficiently reducing the influence of the intensity distribution on the exposure beam.

On the other hand, the clock signal for driving a higher precision modulation signal generation means must be provided at a higher frequency. Thus, a faster semiconductor element used as the modulation signal generation means must be employed, which may be technically difficult and costly.

SUMMARY OF THE INVENTION

An object of the present invention made to overcome the above-identified problems is to provide a scan-exposure apparatus with an inexpensive, simple structure that can generate an exposure beam having an exposure pattern that corresponds to a modulation signal pattern by employing a time compensation means.

A scan-exposure apparatus of the present invention that achieves the above objects comprises: signal generating means for generating a modulation signal comprising a series of values based on a desired intensity distribution pattern; compensation time value generating means for generating a compensation time value based on at least one parameter of the scan-exposure apparatus; compensating means for generating a compensated modulation signal by altering a duration of the values based on the compensation time value; light source means for generating an exposure beam; drive signal generating means for generating a drive signal for controlling the light source based on the compensated modulation signal; and scanning means for generating a scanned exposure beam from the exposure beam.

In the scan-exposure apparatus thus constructed, the signal compensation means measures the difference between two points of the digital compensation signal that are adjacent in time. The exposure time compensation means that changes the period between points of a strobing signal based on the difference measured by the compensation means. Thus, the present invention can generate an exposure beam having an exposure pattern that corresponds to a modulation signal pattern.

BRIEF EXPLANATION OF THE ATTACHED DRAWINGS

FIG. 1 is a circuit diagram of an embodiment of the present invention.

FIGS. 2A–F are graphs showing the operation of a scan-exposure apparatus in accordance with the present invention.

FIGS. 3A–C are graphs showing the operation of a related-art scan-exposure apparatus.

DETAILED DESCRIPTION OF THE PREFERRED EMBODIMENT

Referring to the attached drawings, a scan-exposure apparatus embodying the present invention is explained hereinafter.

Figure 1:
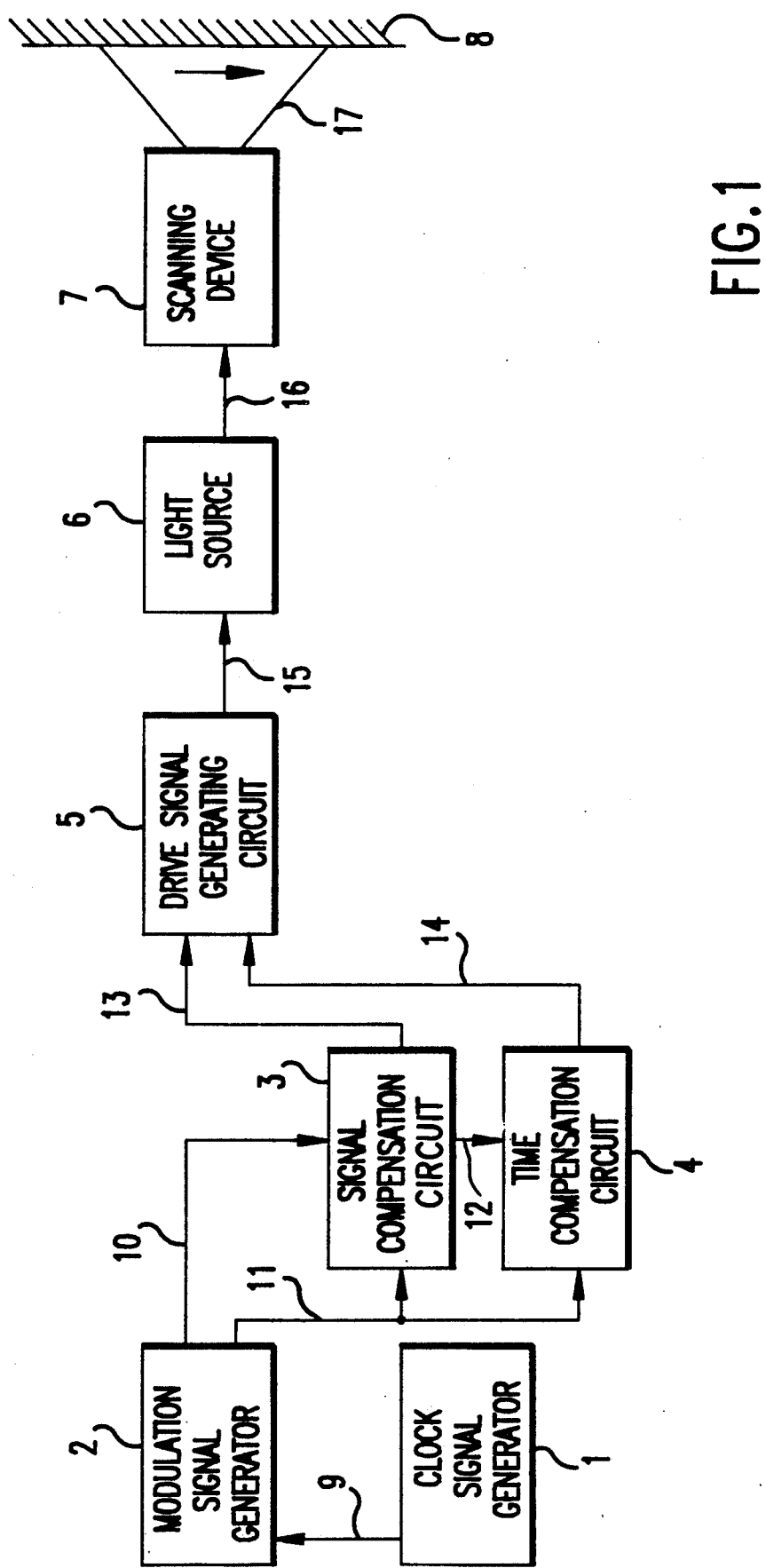

In reference to FIG. 1 illustrating a circuit diagram of the preferred embodiments clock signal generator 1 generates a clock signal 9 for driving a modulation signal generator 2. The modulation signal generator 2 generates a digital modulation signal 10 for modulating the intensity of the exposure beam 16 generated by a light source 6 and a strobing signal 11 for verifying the modulation signal. A signal compensation circuit 3 generates a compensation signal 12 corresponding to the difference between two digital values of the digital modulations signal 10 that are adjacent in time. The signal compensation circuit 3 also generates a compensated modulation signal 13. The compensated modulation signal 13 is the digital modulation signal 10 delayed in time by one time period. Each time period is equal to one cycle of the strobing signal 11.

A time compensation circuit 4, which comprises a delay line and a delay amount switch-over circuit, also receives the strobing signal 11. The time compensation circuit 4 calculates a compensation time amount based on the compensation signal and generates a compensated strobing signal 14 from the strobing signal 11 and the compensation time amount.

A drive signal generating circuit 5 receives the compensated modulation signal 13 and the compensated strobing signal 14 and generates a drive signal is which modulates the intensity of the output of the light source 6 to generate a modulated exposure beam 16. A scanning device 7 converts the exposure beam 16 into a scanning beam 17 that scan-exposes a photosensitive element 8.

The operation of the present embodiment is explained more in detail with specific reference to FIGS. 1 and 2A–F.

Figure 2A:
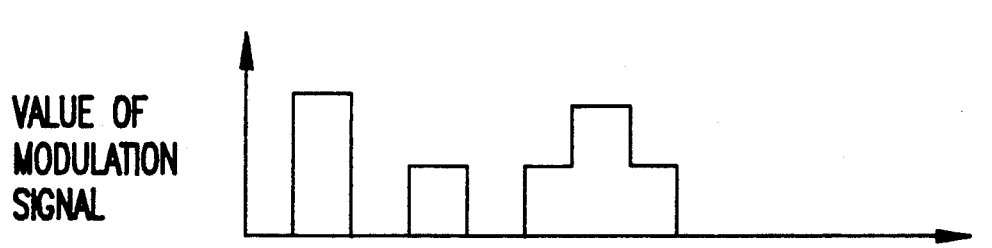
Figure 2B:
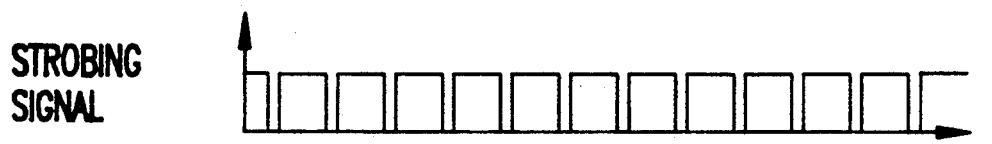
Figure 2C:
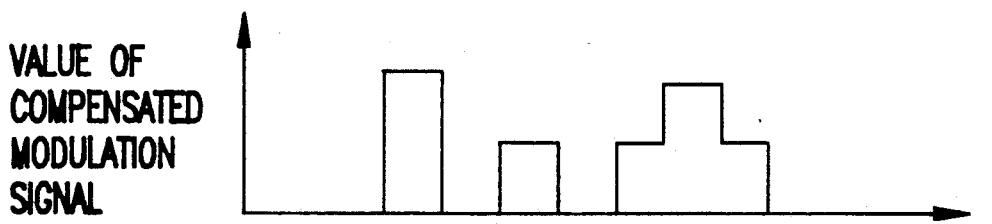

The modulation signal 10, which is shown in FIG. 2A, and the strobing signal 11, which is shown in FIG. 2B, are sent to the signal compensation circuit 3. The signal compensation circuit 3 generates the compensated modulation signal 13 shown in FIG. 2c by delaying the modulation signal by one time period. The signal compensation circuit 3 generates a compensation time value based on the difference between two digital values of the digital modulation signal 10 that are adjacent in time. From the compensation time value, the signal compensation circuit 3 generates the compensation signal 12 that is sent to the time compensation circuit 4.

More particularly, the compensation signal 12 is determined by comparing the digital value of the compensated modulation signal 13 at a given point in time with the digital value of the compensated modulation signal at a point in time immediately before the given point in time. If the first occurring digital value is determined to be greater than the next occurring digital value, a positive time change value is generated as the compensation signal 12. If the first occurring digital value is less than the next occurring digital value, a negative time change value is generated as the compensation signal 12. These generated time values are contained in a memory provided in the signal compensation circuit 3. However, as mentioned above, the compensated modulation signal basically corresponds to the modulation signal delayed by one time interval. Therefore, in the present embodiment, the signal compensation circuit 3 calculates the compensation signal by determining the difference between the modulation signal and the compensated modulation signal during the same time interval.

Figure 2D:
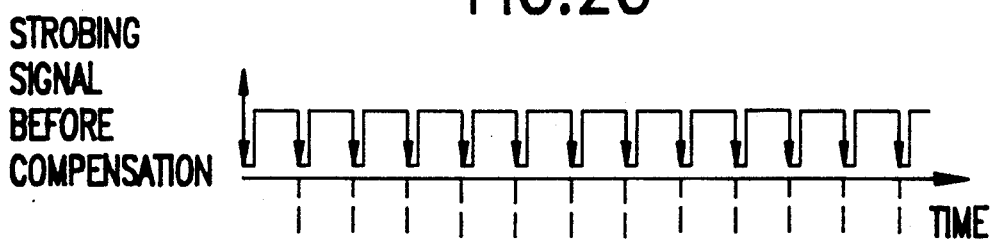
Figure 2E:

The compensation circuit sends the compensation signal 12 to the time compensation circuit 4. The time compensation circuit 4 generates a compensated strobing signal 14 from the compensation signal 12 and the strobing signal 11. The delay line and the delay amount switch-over circuit of the time compensation circuitry adjust the periods between the trailing edges of consecutive strobing pulses of the strobing signal 11 to generate the adjusted strobing signal 14 shown in FIG. 2E. For comparison, FIG. 2D shows the strobing signal immediately before the periods between the trailing edges are adjusted by the delay line and delay amount switch-over circuit.

The drive signal generating circuit 5 generates a drive signal 15 from the compensated modulation signal 13 and the compensated strobing signal 14. The drive signal 15 modulates the intensity of the exposure beam 16 generated by light source 6. The scanning device 7 converts the exposure beam 16 into scanning exposure beam 17. The scanning exposure beam exposes the photosensitive element 8. The pattern of exposure of the photosensitive element 8 is shown in FIG. 2F.

Figure 2F:
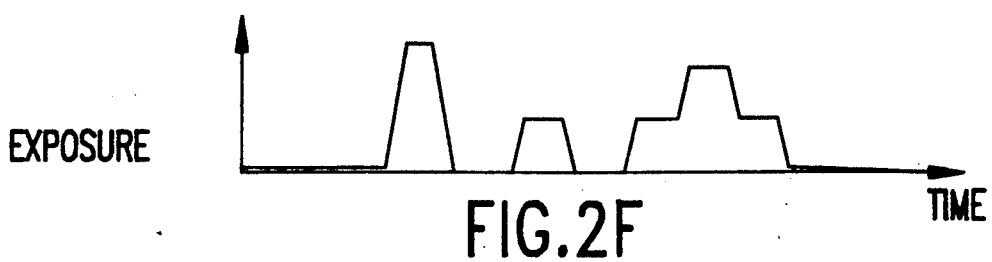
Figure 3A:
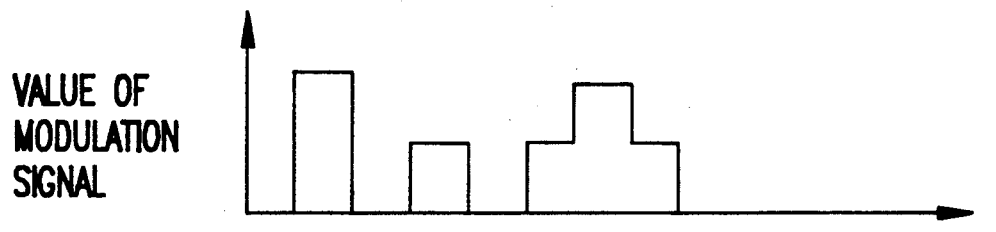
Figure 3B:
Figure 3C:
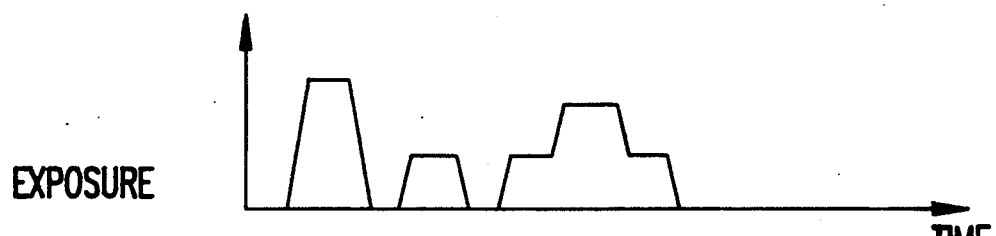

The exposure pattern for the present invention shown in FIG. 2F is quite similar in area and duration to the modulation signal shown in FIG. 2A. In contrast, in the related-art device, a modulation signal shown in FIG. 3a and a strobing signal shown in FIG. 3b are directly sent to a modulation drive means from a modulation signal generator. Accordingly, as is clearly shown in FIG. 3, the exposure pattern on the photosensitive element in the related-art device shown in FIG. 3c is quite different in duration from the modulation signal shown in FIG. 3a.

While the described embodiment represents the preferred form of the invention, it is to be understood that the changes and the variations may be made without departing from the spirit and the scope of the invention.

For instance, in the present invention the compensation time value is based on the difference between two digital values of the digital modulation signal 10 that are adjacent in time. The characteristics of the photosensitive element 8 and the toner may also be incorporated as factors for determining the compensation time value used to generate the compensation signal 12. The compensation time value incorporating these additional factors will be stored in the memory element in the signal compensation circuit 3. Furthermore, if the compensation time value is easily determined, an arithmetic circuit may be substituted for the memory means in the signal compensation circuit 3.

In the present invention, the modulation signal for modulating the intensity of the exposure beam and the strobing signal are sent to both the detection means and the time compensation means in order to reduce the influence of the intensity distribution pattern on the exposure beam, thereby rendering the pattern of the modulation signal similar to the pattern of the exposure and reducing the cost of the system.

What is claimed is:

1. A scan-exposure apparatus, comprising:
signal generating means for generating a modulation signal comprising a series of digital values based on a desired intensity distribution pattern of an exposure beam and for generating a strobing signal;
first compensating means for generating a compensated modulation signal by delaying the modulation signal by one time period and or generating a compensation time value based on a difference between digital values o the modulation signal, said digital values being adjacent in time;
second compensating means for generating a compensated strobing signal by alternating the strobing signal based on the compensation time value;
light source means or generating an exposure beam;
drive signal generating means for generating a drive signal for controlling the light source means based on the compensated modulation signal and the compensated strobing signal; and
scanning means of generating a scanning exposure beam from the exposure beam.

2. The scan-exposure apparatus of claim 1, in which:
the modulation signal comprises a series of digital values whose amplitudes indicate a level of modulation and a series of timing pulses indicating a duration of modulation;
the strobing signal comprises a series of strobing pulses; and
the second compensating means generates a compensated strobing signal by altering the duration of the strobing pulses.

3. The scan-exposure apparatus of claim 2, in which the first compensating means delays the series of digital values by one timing pulse while the second compensating means alters the duration of the strobing pulses.

4. The scan-exposure apparatus of claim 2, in which the second compensating means alters the duration of the strobing pulses by altering the trailing edges of the strobing signal output from said signal generating means according to the compensation time value.

5. A scan-exposure apparatus, comprising:
clock signal generating means o generating a clock signal;
signal generating means for generating a modulation signal comprising a series of digital values based on a desired intensity distribution pattern of an exposure beam and generating a strobing signal comprising a series of strobe pulses based on the clock signal;
signal compensating means for generating a compensation time value based on a difference between digital values of the modulation signal which are adjacent in time and generating a compensated modulation signal by delaying the modulation signal by one time period;
strobing signal compensating means for generating a compensates strobing signal by alternating the strobing signal based on the compensation time value;
light source means for generating an exposure team;

drive signal generating means of generating a drive signal for controlling the light source means based on the compensated strobing signal and the compensated modulation signal; and scanning means or generating a scanning exposure beam from the exposure beam.

6. The scan-exposure apparatus of claim 5, in which the modulation signal comprises a series of digital values whose amplitudes indicate level of modulation.

7. The scan-exposure apparatus of claim 6, in which digital compensating means delays the series of digital values by one timing pulse while the strobing signal compensating means alters the durations of the strobe pulses.

8. The scan-exposure apparatus of claim 6, in which the strobing signal compensating means alters the duration of the strobe pulses by altering trailing edges of the strobe pulses according to the compensation time value.

9. A scan-exposure apparatus, comprising:

clock signal generating means or generating a clock signal;

signal generating mans for generating a digital modulation signal based on a desired intensity distribution pattern of an exposure team and generating a probing signal comprising a series of strobe pulses based on the clock signal;

signal compensating mans for generating a compensation time value base and a difference between digital values of the digital modulation signal that are adjacent in time and generating a compensated modulation signal by playing the modulation signal by one time period;

strobing signal compensating means of gentling a compensated strobing signal by altering the strobing signal based on the compensation time value;

light source means for gentling an exposure beam;

drive signal generating means for generating a drive signal for controlling the light source means based on the compensated strobing signal and the compensated modulation signal; and scanning means of generating a scanning exposure beam from the exposure beam.

10. The scan-exposure apparatus of claim 9, in which the modulation signal comprises a series of digital values whose amplitudes indicate a level of modulation.

11. The scan-exposure apparatus of claim 10, in which these probing signal compensating means alters the duration of the timing pulses based on the compensation time value generated by said signal compensating means, said signal compensating means comparing the digital value of the compensated modulation signal at a given point in time with the digital value of the compensated modulation signal at a point in time immediately before the given point in time and generating a positive time change value if the first digital value in time is greater than the next digital value in time and generating a negative time change if the first digital value in time is less than the next digital value in time.

12. The scan-exposure apparatus of claim 10, in which the signal compensating means delays the series of digital values by one strobe pulse while the strobing signal compensating means alters the duration of the strobe pulses.

13. The scan-exposure apparatus of claim 10, in which the strobing signal compensating means alters the durations of the strobe pulses by altering the trailing edges of the strobe pulses according to the compensation time value.

* * * * *